Dec. 22, 1953 K. RENTSCHLER 2,663,233
CAMERA SHUTTER INCORPORATING FLASH SYNCHRONIZING MECHANISM
Filed June 5, 1950 2 Sheets-Sheet 2

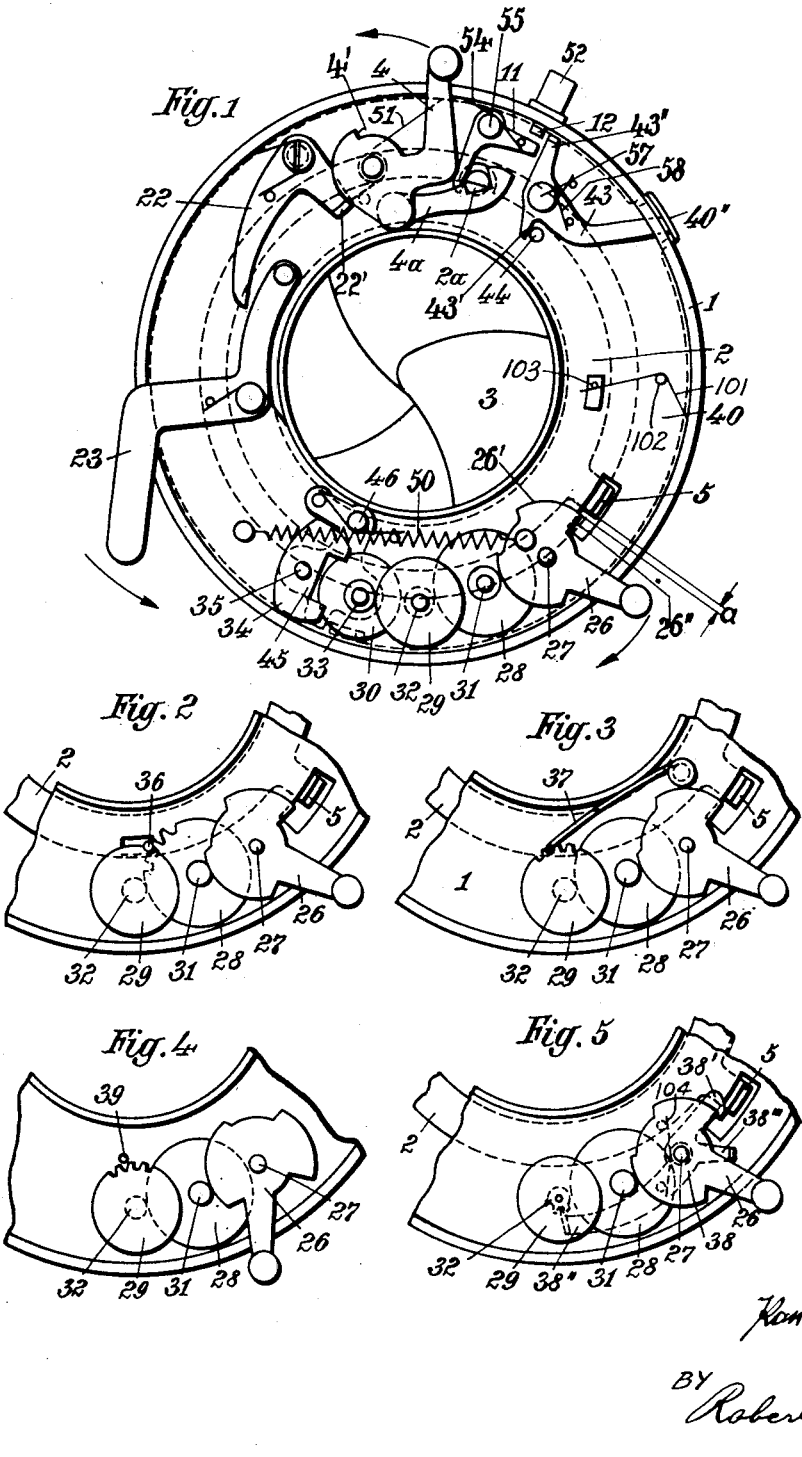

Inventor:
Karl Rentschler
by
Robert H. Jacob

Patented Dec. 22, 1953

2,663,233

UNITED STATES PATENT OFFICE 2,663,233

CAMERA SHUTTER INCORPORATING FLASH SYNCHRONIZING MECHANISM

Karl Rentschler, Calmbach (Enz), Germany, assignor to Alfred Gauthier G. m. b. H., Calmbach (Enz), Germany Application June 5, 1950, Serial No. 166,142

Claims priority, application Germany January 30, 1950

9 Claims. (Cl. 95—11.5)

The present invention relates to a photographic camera shutter with contactor mechanism for firing photoflash lamps.

The invention deals with the problem, to provide a camera shutter of universal utility in the annular space of which a mechanism is accommodated which provides for the control of shutter speeds within a wide range, and also permits automatic release as well as selective and absolute synchronization between the time curve of the shutter and the characteristic of the flash bulb.

In accordance with the invention this problem is solved in that switching or adjusting means are provided in the shutter which permit the use of the separate mechanisms or parts thereof not only independently, but also for operating the other mechanisms.

For example, if the shutter with a contact mechanism for the flash release is so arranged that contact is made by the action of releasing the shutter and the opening of the shutter blades with respect to the flash release is delayed by a retarding mechanism, then the generic principle of the invention may be realized in that the retarding mechanism provided in the shutter mechanism together with the contact mechanism forms a part of the delay-action or self-timer mechanism which is provided with a disengageable part for flashlight exposures. This arrangement effects a substantial saving in space and weight which favors the disposition of the contact retarding mechanism within the shutter casing. Thus a compact shutter assembly including contact mechanism for photoflash release is obtained, because a special contact retarding mechanism can be eliminated for which, at any rate, no space is available in normal shutters (size 00).

The invention is based on the further problem, to satisfy the increasing demand for structural space limitation and for complete synchronization of the photoflash while retaining the delayed action mechanism for taking pictures automatically as well as the retard or escapement mechanism for the shutter speeds. In accordance with the invention this has been accomplished in that the same actuating lever is employed for the selective setting of the delayed action mechanism as well as the contact timing mechanism, while special adjusting means for the escapement timings associated with the various types of photoflash bulbs are eliminated. Thus, a special adjusting lever is eliminated in accordance with the present invention. This means not only a saving of space axially of the shutter, but also permits substantial simplifications of structural nature.

The manner in which this is realized is now explained with reference to the drawings, where Fig. 1 shows in a plan view the manner in which the essential members of the shutter in accordance with the invention cooperate;

Fig. 2 shows in a partial plan view of the shutter in released position one embodiment of the stopping or blocking means of the delayed-action mechanism and the contact retard mechanism;

Fig. 3 shows an alternate embodiment of the principle according to Fig. 2, also in the "unset" position;

Fig. 4 shows in a similar view another embodiment of the invention shown in Figs. 2 and 3, but in the "set" position;

Fig. 5 shows in a similar view a still further embodiment of the invention shown in Figs. 3 and 3;

Figure 6:
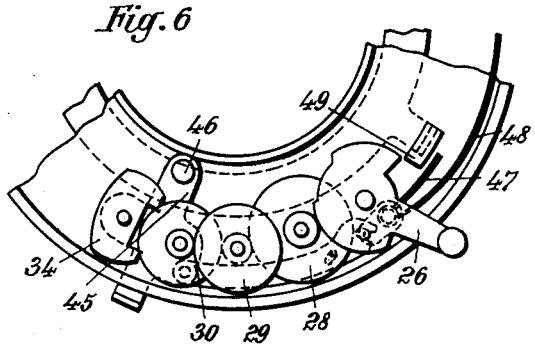
Fig. 6 is a plan view of the delayed action mechanism and clearly reveals the disengageable part thereof.

Fig. 1 shows the shutter casing 1 in which is provided ring 2 which operates shutter sectors 3 and which may be turned back and forth by shutter setting lever 4 of the shutter by a pawl 4a which engages a pin 2a on the sector ring. Shutter release trigger 23 trips shutter setting lever 4 from its cocked position in which it is held by pivoted bell-crank lever 22. Fig. 1 shows furthermore that the sector ring 2 supports the projecting lug 5 which is in operative relationship to the operating lever 26 of the delaying or contact retard mechanism, so that the opening of the shutter can be controlled by the arcuated shoulder 26′ on lever 26.

The sector ring 2 is biased in counterclockwise direction by a return spring 101 which is disposed around a pivot pin 102 pressing with one end against a pin 103 projecting from the sector ring and with the other end against the housing.

In accordance with the invention it is essential that the same operating lever 26 serves for selectively tensioning the delayed-action mechanism as well as the contact retard mechanism. For this purpose the delayed-action mechanism is arranged to pivot about a pivot 27 in a manner known per se, and it comprises the wheel disks (not shown) as well as gears 28, 29, the balance wheel 30 and pinions 31, 32, 33 and the balance lever 34 with its pin 35. When using this presetting or delayed-action mechanism as a retarding mechanism while taking photoflash pictures the balance wheel 30 and the lever 34 together with pinion 33 and pin 35 are disengaged.

It is not absolutely necessary to arrange the delayed-action or contact timing mechanism for pivotal movement. However, pivoting is desirable where rigid members are used for stopping the delayed-action or contact timing mechanism, for example, when a pin 39 (Fig. 4) is mounted upon the base plate of the casing.

If the stop pin is provided upon ring 2, as shown in Fig. 2, and is permitted to engage the gear of wheel 28, then the delayed-action mechanism should preferably be rigidly mounted. With the shutter cocked the pin 36 engages the teeth of gear 28 due to the biasing of the sector ring by spring 101. As lever 26 moves clockwise during the cocking movement, wheel 28 moves counterclockwise while pin 36 with the sector ring is moved aside against the spring pressure. When the movement of lever 26 ceases pin 36 is held in a tooth gap under the slight pressure of spring 101 which is just sufficient to hold the mechanism locked in position. Upon tripping of the shutter mechanism by lever 23, the sector ring moves first clockwise until lug 5 engages shoulder 26' on lever 26. This movement is sufficient to disengage pin 36 from gear 28, thus effecting the release of the gear train, while delaying further clockwise movement of ring 2 and consequently of the shutter until shoulder 26' clears lug 5.

The same arrangement is recommended if a three armed lever 38 is provided as a stopping means, as shown in Fig. 5. As shown, the pivot is then around pin 27 of the operating or setting lever 26. Arm 38' of the lever 38 is actuated by the turned up lug 5, while the second arm 38'' engages pinion 32. The third arm 38''' clears the path for lug 5 along arm 38' and disengages arm 38'' when the delayed-action mechanism is in the released condition. Movement of lever 26 clockwise causes clockwise movement of gear 32 while the end of arm 38'' of lever 38 is moved outwardly by the teeth of the gear against the effect of spring 104, and sliding of arm 38'' under the pressure of that spring into a gap behind a tooth to retain lever 26 in cocked position. While in cocked position the pressure of spring 50 holds the flat side of a tooth on gear 32 against the flat end of lever 38''.

The pivoted arrangement of the delayed-action or contact retard mechanism is particularly advisable when the stopping action is effected by a spring 37 as in Fig. 3, which spring engages gear 29. Upon tripping of the shutter the gears are moved counterclockwise around pivot 27, thereby releasing the retard mechanism for operation.

Figure 7:
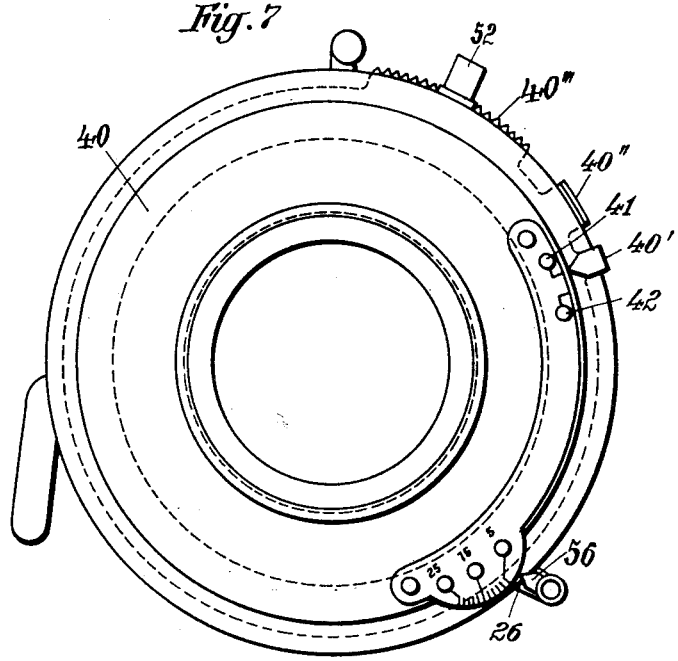
Fig. 7 is a plan view of the front plate of the shutter.

Fig. 1 furthermore shows that for coupling the delayed-action or contact retard mechanism a ring 40 is provided which is mounted at the rear of the shutter. This ring 40 also serves for disengaging or disconnecting those parts of the delayed-action mechanism which must be idle when it is used as a contact-retard mechanism. The annular design of the coupling makes it possible that the actuating lever 26 for the flash bulb circuit can be provided in any desired position along the circumference of the casing 1. The same applies to the setting marks which are shown in Fig. 7. Here 41 and 42 refer to the two marks to which the ring can be adjusted, and which indicate whether the delayed-action mechanism or the contact-retard mechanism is operative. These marks may be colored. If the lever of the contact retard mechanism is marked red, it is desirable to color the associated mark 41 red. If the point of the indicator 40' of ring 40 has been set to yellow mark 42, it means that the shutter is set to operate for flash pictures with a delay of 5 to 25 milliseconds in the firing. When the ring 40 is turned to move pointer 40' to mark 42, the spring biased bridge 45 is moved by a lug on the ring to disengage wheel 29 and pinion 33. It should be pointed out that the flash light time-lag characteristic numbers ranging from 5 to 25 milliseconds can be likewise colored yellow to correspond to the yellow colored mark 42. This controlled time-lag allows for the various types of photoflash bulbs. 5 means that the flashbulb has a relatively short time lag while 25 refers to flashbulbs having the longest time lag encountered in actual practice.

Fig. 1 shows also the second contact lever 43 which starts the time-lag of 5 to 25 milliseconds and which can be locked or released by ring 40 which controls the delayed-action or contact retard mechanism. For this purpose a lug 40'' is provided on ring 40.

It is recommended to control the contact lever 43 as well as contact lever 11 by way of the shutter operating ring 2. As shown by Fig. 1, this is done, by example, in a manner that contact lever 43 engages a rivet 44 which is mounted on the driving ring 2. In the same manner, the contact lever 11 may engage rivet 2a, mounted on the operating ring 2. Both contact levers make contact with the same connector nipple 12.

It is also apparent from Fig. 1 that an outstanding constructive solution will be obtained by rendering inoperative a part of the delayed-action mechanism when operating it as a contact retard mechanism in a manner that in order to render inoperative part of the delayed-action mechanism the balance wheel 30 and balance lever 34 are mounted on a bridge which can be disengaged. As shown this bridge is formed as a one armed lever 45, the pivot of which is as remote as possible from the pivot of the balance wheel 30.

The particular advantage of this arrangement is that the slight curvature permits of safe unmeshing of the gears. It should be noted that the bridge 45 can be connected or disconnected by rotating ring 40. Rotation of ring 40 is effected manually in a manner known per se, by gripping the chamfered circumference of ring 40.

It can be seen from Fig. 6, illustrating another structure of contact retard mechanism, that a contact spring 47 is associated with the contact-retard mechanism which is connected to the connector nipple 12 by means of conductor 48. In the position for "contact-retard mechanism" this spring 47 makes contact with a contact post 49 mounted on, and insulated from the operating ring 2, while in the position for delayed action mechanism movement of the lever 45 by ring 40 swings aside the contact spring 47, thus preventing contact operation. Spring 47 is mounted on a movable insulating member disposed on lever 26. This member is under the control of an arm (shown in dotted lines) which is connected to the bridge 45 in a manner that clockwise movement of the bridge establishes contact between spring 47 and contact 49.

From the foregoing follows that: either the shutter assembly operates as an ordinary shutter, hence without a delayed action mechanism and without a flash (case 1), or that the assembly operates in combination with a delay-less flash (case 2), or that the delayed action mechanism is made operative for self-exposure resp. for taking pictures automatically when no flashbulb is used (case 3), or that the delayed action mechanism is made operative for taking pictures automatically while at the same time a delay-less flash is used without a time lag (case 4), or that the contact retard mechanism operates for flash synchronization when flashbulb exposures are made with a time lag (case 5).

In case 1 (straight use as a shutter), the shutter mechanism is cocked by means of the shutter setting lever 4, and released by shutter release trigger 23. It is assumed herewith that the shutter speed has been set in a known manner to some value between 1 second and 1/500 seconds, and that the iris has been stopped down to the desired effective aperture. These means are presumed to be known per se, and they are not the subject of this invention. But it is necessary to point out that the shutter assembly the improvement of which is the subject of the present invention is provided with these known features.

In case 2 (straight shutter operates with delay-less flash), the delay-less flashbulb connected with fitting 52 is set off upon contact closure between the pair of contacts 11, 12, the mechanism of which is discussed in detail in connection with case 4.

In case 3 (self-exposure) care should be taken that pointer 40' of ring 40 points toward mark 41. In this case the delayed action mechanism of the shutter is rendered operative. Thus in the arrangement of Fig. 1, all of the elements 26 through 35 are enmeshed. The actuating lever 26 is now turned in the direction indicated by the arrow to a stop, which is not shown to provide for greater clarity. This movement serves to tension spring 50 which brings the delayed action mechanism to its cocked position. In the same manner, the shutter setting lever 4 is rotated in the direction indicated by the arrow, until nose 4' falls behind nose or pointer 22' of lever 22. The shutter assembly mechanism is thus brought into operative position in that the movement of lever 4 tensions the spring 51. Now one can proceed to release the shutter by the release trigger 23. As the latter is rotated in the indicated arrow direction, the gear train of the delayed action mechanism is brought into action by spring 50 by way of means such as pin 36 on ring 2 as indicated in Fig. 2. The shutter proper is set free for exposure only after lever 26 and its associated curved section 26' have been rotated counterclockwise far enough that the projecting lug 5 is set free to pass the falling edge 26", under the pressure exerted by spring 51 by way of the shutter setting lever 4 and the driving pawl 4a. The run-down time of the delayed action mechanism covers a time period of about 10 seconds in conformity with what has been found necessary in self-exposure work resp. in taking pictures automatically.

In case 4 (self-exposure with delay-less flashbulbs) the pointer 40' is set as in case 3. For this reason, the operative pattern of the delayed action mechanism is identical as in case 3, with the addition that a delay-less flashbulb connects to the connector fitting 52. If now upon actuation of trigger 23 the delayed action mechanism 26 to 35 runs down, the partitioned blade-ring pin 2a attached to ring 2 is taken along as the actuator ring 2 proceeds in clockwise direction upon release of its nose 5 from the edge 26" of the curved section 26'. This rotates contact lever 11 under the pressure of spring 54 around the bearing point 55 until it meets its mating contact 12 which energizes the delay-less flash-bulb joined to connector fitting 52. In this case the flash will thus light after the delayed action mechanism 26 through 35 has performed its run.

In case 5 (contact retard mechanism for full synchronization in work with flashes of varying slow-action characteristics), the attached pointer 40' is moved to the mark 42 by means of the knurled rim 40''' of ring 40. This swings lever 45 pivoted at 46 (Fig. 1) far enough to disengage the elements (30, 33, 34 and 35) not needed in contact retard operation, so that the contact retard mechanism proper includes parts 26 to 29, as well as 31 and 32. The run-down time of this contact retard mechanism is adjusted to correspond to the slow-action characteristics of the respective types of flash used. It is accurately set by means of the lever 26 and its associated pointer 56 (Fig. 7) to the various time lag characteristic numbers of the flashlight (5, 15, 25 milliseconds). Depending on these settings, a smaller or larger angle of the curved section 26' is placed ahead of nose 5 of the actuator ring 2.

As ring 40 is rotated by its knurled rim 40''' to be set on mark 42, the bent-over lug 40'' is taken along. This removes the latter, as shown in Fig. 1, from the swinging range of the second contact lever 43 pivoted around shaft 57 and loaded by spring 58. This, however, does not at all clear lever 43 for actual rotation since a second stop has been provided in pin 44 mounted on actuator ring 2. This second stop moves along with ring 2 at the moment when by actuation of trigger 23 the actual release has been made, and nose 22' thus has disengaged from nose 4'. Ring 2 now moves through a small angle which corresponds to the separation a between nose 5 on ring 2 and the curved section 26' on lever 26. On the one hand, this separation is large enough, to bring with the aid of spring 58 contact arm 43'' of contact lever 43, the nose 43' of which follows pin 44 mounted on actuator ring 2, into positive engagement with contact 12, while on the other hand it is small enough to keep the blades in mutually covering position. This completes again the electrical circuit of the flashbulb connected to fitting 52. The flash proper, however, will light only when depending upon the characteristic of the respective flashlight used the curved section 26' has proceeded to the falling edge 26'', so nose 5 with ring 2 is free to move so that the shutter proper can now definitively go through its opening and reclosing routine.

From this operational description of this assembly it is evident that depending upon the position of ring 40 lever 26 serves at option for activating the delayed action mechanism or for activating the contact retard mechanism while allowance is made for the various slow-action characteristics of the flash bulbs used.

Whatever the embodiment of the inventive concept may be, it is essential that on a trigger type shutter with presetting means and photoflash tripping means, besides the cocking and release levers only two levers are required for the automatic release and to make contact.

That what I claim is:

1. In a camera shutter of the type having a sector ring operated by a spring biased trigger, a delaying mechanism for automatic exposures comprising a spring operated gear train, and flash release means, synchronizing means for synchronizing the opening of the shutter with the peak of flash; said synchronizing means comprising contact means including a stationary contact and a movable contact having a member in engagement with a member on said sector ring, a first group of said gear train including a toothed portion adapted to be engaged and released for operation by a detent member disengageable by said sector ring, a shoulder portion on one member of said gear train adapted to engage said sector ring to delay the opening of said shutter and manually operated members adapted to operatively engage the second group of said gear train and said movable contact to disengage said second group from said first group and free said movable contact for operation by said sector ring.

2. In a camera shutter of the type having a sector ring operated by a spring biased trigger, a delaying mechanism for automatic exposures comprising a spring operated gear train, and flash release means, synchronizing means for synchronizing the opening of the shutter with the peak of flash; said synchronizing means comprising contact means including a stationary contact and a movable contact having a member in engagement with a member on said sector ring, a first group of said gear train including a toothed portion adapted to be engaged and released for operation by a detent member disengageable by said sector ring, a shoulder portion on one member of said gear train adapted to engage said sector ring to delay the opening of said shutter and manually operated members adapted to operatively engage the second group of said gear train and said movable contact to disengage said second group from said first group and free said movable contact for operation by said sector ring, said manually operated members being lugs on a separate movable ring.

3. In a camera shutter of the type having a sector ring operated by a spring biased trigger, a delaying mechanism for automatic exposures comprising a spring operated gear train, and flash release means, synchronizing means for synchronizing the opening of the shutter with the peak of flash; said synchronizing means comprising contact means including a stationary contact and a movable contact having a member in engagement with a member on said sector ring, a first group of said gear train including a toothed portion adapted to be engaged and released for operation by a detent member disengageable by said sector ring, a shoulder portion on one member of said gear train adapted to engage said sector ring to delay the opening of said shutter and manually operated members adapted to operatively engage the second group of said gear train and said movable contact to disengage said second group from said first group and free said movable contact for operation by said sector ring, said detent member disengageable by said sector ring being defined by a lever arm pivoted around the pivot of said one member of said gear train having said shoulder portion.

4. A camera shutter mechanism having a sector ring and including a delaying mechanism for automatic exposures adapted to delay the opening of the shutter upon release of the trigger mechanism, a synchronizing mechanism to regulate the firing of flash bulbs and the opening of the shutter and means for adapting a part of said delaying mechanism to constitute said flash synchronizing mechanism, said delaying mechanism comprising a gear train including a first group of members comprising a balance wheel and a balance lever pivotally supported on a bridge, and a second group of members independently constituting the gear train for said flash synchronizing mechanism disposed in fixed position with respect to said first group and adapted to be engaged thereby, a spring connected between said second group and a point in the shutter housing, said second group also including a gear member adapted to be moved by said spring to transmit movement to the other gears of said gear train and a movable portion presenting a smooth engagement surface, said sector ring including a lug adapted to engage said smooth surface while it is being moved by said spring, a member having engagement with said bridge adapted to move said first group out of engagement with said second group, an adjusting lever associated with said second group for moving said gears into operative position, a detent member disposed to bear against a member of said second group while in operative position, and a pair of contacts constituted by a movable lever controlled by said sector ring and a stationary contact adapted to close after release of said sector ring by the trigger mechanism before said lug of said sector ring has engaged said smooth surface.

5. A camera shutter mechanism in accordance with claim 4, wherein said detent member is adapted to be moved by said sector ring and said member having engagement with said bridge comprises a manually operated ring supporting a lug adapted to engage said bridge.

6. A camera shutter mechanism in accordance with claim 4, wherein said detent member is constituted by a three armed lever pivoted around the same pivot as said gear member, and includes a spring biased arm adapted for engagement by said lug on said sector ring to release said flash synchronizing mechanism, an arm adapted to engage said adjusting lever and an arm adapted to engage a gear in said second group while said adjusting lever is in operative position.

7. A camera shutter mechanism having a sector ring adapted for rotary movement to operate the shutter blades and a delaying mechanism for delaying the opening of the shutter, responsive to the operation of the trigger and provided with an adjusting lever; said delaying mechanism being adapted to enable the taking of pictures automatically and incorporating a flash synchronizing mechanism for synchronizing the firing of flash bulbs with the opening of the shutter and including, in combination, a gear train comprising a first group of members including a balance wheel and a balance lever pivotally supported on a bridge and a second group of members independently constituting the gear train of said flash synchronizing mechanism disposed in fixed position with respect to said first group and adapted to be engaged thereby, a spring connected between said second group and the shutter housing, said second group also including a gear member adapted to be moved by said spring to transmit movement to the remaining gears of said gear train and an arcuated portion presenting a smooth engagement surface, a lug on said sector ring adapted to engage said arcuated portion, detent means adapted to engage a member of said second group, electric circuit means comprising a first contact lever adapted for operation controlled by said sector ring, a second contact lever controlled by said sector ring and adapted for closing a flash light circuit after said sector ring has been released by way of the operation of the trigger and before said lug of said sector ring has engaged said smooth surface and comprising a connector nipple having a contact for engagement with said first and second contact levers and a manually movable ring adapted in one position to prevent movement of said second contact lever and in the other position to pivotally move said first group of members on said bridge from engagement with said second group and to free said second contact lever.

8. The means in accordance with claim 7 wherein said manually movable ring includes a first lug disposed circumferentially of said ring adapted to render said second contact lever inoperative, and a second lug adapted to engage said bridge to disengage said first group and said second group of members while said second group is conditioned to operate as a flash synchronizing mechanism.

9. A camera shutter mechanism having a sector ring adapted for rotary movement to operate the shutter blades and a delaying mechanism for delaying the opening of the shutter, responsive to the operation of the trigger and provided with an adjusting lever; said delaying mechanism being adapted to enable the taking of pictures automatically and including a flash synchronizing mechanism for synchronizing the firing of flash bulbs and including, in combination, a gear train comprising a first group of members including a balance wheel and a balance lever supported on a manually movable bridge and a second group of members including said adjusting lever and independently constituting the gear train for said flash synchronizing mechanism disposed in fixed position relatively to and for engagement by said first group and including a spring for moving said gear train connected to the shutter housing, a gear portion on said adjusting lever adapted to transmit movement imparted by said spring to said gear train and an arcuated portion on said adjusting lever presenting a smooth engagement surface, a lug on said sector ring supporting a contact insulated therefrom and adapted to engage said arcuated portion, detent means adapted to engage a member of said second group to detain said adjusting lever and releasable by the movement of said sector ring, electrical contact means including a stationary contact on the shutter housing, a contact lever controlled by said sector ring to engage said stationary contact, a contact spring disposed upon and insulated from said adjusting lever and electrically connected with said stationary contact, and a shifting lever adapted to engage said contact spring and said contact on said lug in response to the movement of said bridge.

KARL RENTSCHLER.

References Cited in the file of this patent

UNITED STATES PATENTS

| Number | Name | Date |
|---|---|---|
| 1,941,292 | Deckel et al. | Dec. 26, 1933 |
| 2,094,799 | Lingg et al. | Oct. 5, 1937 |
| 2,238,453 | Small | Apr. 15, 1941 |
| 2,358,941 | Schwarz | Sept. 26, 1944 |
| 2,480,604 | Pirwitz | Aug. 30, 1949 |